3,745,152
PROCESS FOR POLYMERIZING LACTAMS WITH
TRITYL-4-N-TRITYL AMINO BUTYRATE
Aldemaro Ciaperoni and Enrico Pontoglio, Bollate, and Giovanni Cravini, Rho, Italy, assignors to Montecatini Edison S.p.A., Milan, Italy
No Drawing. Filed Mar. 17, 1971, Ser. No. 125,340
Claims priority, application Italy, Mar. 17, 1970, 22,100/70
Int. Cl. C08g 20/16
U.S. Cl. 260—78 P
4 Claims

ABSTRACT OF THE DISCLOSURE

A process for the anionic polymerization of lactams in the presence of a tritylic derivative as polymerization activator is disclosed. The tritylic derivative, trityl-4-N-tritylaminobutyrate is a new product in the art. A process for making it is also disclosed.

PRIOR ART

It is known to polymerize lactams, in particular pyrrolidone, piperidone and caprolactams, in contact with alkaline catalysts such as, for instance, alkaline metals, oxides and hydroxides of alkaline metals, organometallic compounds, and ammonium quaternary bases.

It is also known to increase the activity of the catalysts used in the anionic polymerization of the lactams by including various polymerization activators in the polymerization zone.

The activators used have included acylic derivatives, lactones, alkyl esters of mono- and dicarboxylic acids, isocyanates, N-substituted secondary amines, N-cyanolactams, and urea derivatives.

Some of those compounds, while being efficient activators of the polymerization, involve various disadvantages as, for instance, (1) they color the polymer obtained undesirably; (2) due to secondary reactions favored by the alkaline medium in which they are used, polymerization runs with the known activators are not reliably reproducible; and (3) for the reason stated, the polymeric lactams obtained using the known activators generally show a non-homogeneous molecular weight distribution and a marked decrease in viscosity after heat-treatment.

When the known activators are used in the polymerization of pyrrolidone, for example, at temperatures of from 20° C. to 60° C., the maximum polymer yield obtainable is 80 to 85%, even when the polymerization time is in excess of 18 hours.

THE PRESENT INVENTION

According to our invention, the lactams are polymerized in contact with an alkaline catalyst but in the presence of a new polymerization activator which is, in and of itself, a new product.

Our activator is a tritylic derivative, specifically, trityl 4-N-tritylaminobutyrate.

Our contribution to this art includes the provision of the trityl derivative as a new product, and a process for making it involving the reaction of pyrrolidone, an alkaline hydroxide, and trityl chloride.

The advantages of polymerizing lactams in contact with the tritylic derivative are manifold. For example, when pyrrolidone is polymerized by the present process, using the trityl derivative as the polymerization activator, the polymer obtained (1) has a high molecular weight; (2) is obtained in high yields as exemplified below and in polymerization times shorter than those required when the prior art activators are used; (3) the reproducibility of the polymerization runs is good; (4) the polymers exhibit a homogeneous distribution of the molecular weight; (5) the affinity of the polymers for acid dyestuffs is improved; and (6) the polymers have good heat-stability.

Polyprrolidone obtained with the use of the known activators is unstable at high temperatures. If it is exposed to prolonged heat treatment, the polymeric chains are degraded, with formation of monomer and a considerable decrease in the initial viscosity of the polymer. As a result of this heat-sensitivity, the polypyrrolidone obtained by the known processes cannot be used for the production of filaments by the melt-spinning technique.

In contrast, the polypyrrolidone obtained by polymerizing the monomer in contact with the tritylic activator has a greater heat-resistance, a constant viscosity, and loses less weight, in percent, after heat-treatment, than the polypyrrolidone produced by the known processes, using the known, prior art activators. The molten polypyrrolidone obtained according to this invention can be extruded, and formed into filaments or fibers by melt-spinning.

The improved receptivity for acid dyestuffs exhibited by the fibers is due to the introduction of a basic amino group into the polymeric chain by the tritylic activator.

The advantages realized in the polymerization of pyrrolidone are also realized when other lactams, such as the caprolactams, are polymerized in contact with the tritylic activator, namely, a high polymerization rate, high yields, a homogeneous distribution of the molecular weight, improved heat-resistance, and improved receptivity for the acid dyestuffs.

Polymerization of pyrrolidone in accordance with this invention is carried out at a temperature between —10° C. and +70° C., preferably between 20° C. and 50° C. It is possible to effect the polymerization in bulk, or with the monomer in suspension in a solvent such as, for instance, petroleum ether, gasoline, kerosene, pentane, hexane, octane, iso-octane, cyclohexane, cyclohexene, octene, pentene, and other saturated and unsaturated hydrocarbons as inert suspending agent.

In practice, when the monomer is pyrrolidone, the catalyst used is, preferably, the salt derived from pyrrolidone and benzyltrimethylammonium hydroxide. Other alkaline catalyst may also be used.

The tritylic activator is introduced into the reaction vessel containing the monomer and the catalyst.

When the monomer is caprolactam, the polymerization is carried out at a temperature in the range 80° C. to 250° C., preferably 120° C. to 180° C., and either in bulk or with the monomer suspended in an inert solvent of the kind mentioned.

In practice, when the monomer is caprolactam, the preferred catalyst is sodium caprolactam. Other alkaline catalysts can be used.

The amount of catalyst used in polymerizing the lactams in accordance with this invention is generally from 0.1 to 10 mol percent, preferably 1.0 to 3.0 mol percent, based on the mol percent of monomer used.

The amount of tritylic activator used is generally 0.01 to 2.0 mol percent, preferably 0.1 to 1.0 mol percent, with respect to the monomer.

The following examples are given to illustrate the invention and are not intended to be limiting.

Example 1

(a) Preparation of the activator.—0.2 mole of pyrrolidone is reacted for 2 hours at 90° C. with 0.2 mole of KOH in 200 cc. of xylene.

100 cc. of xylene are distilled and added, together with 0.2 mole of tritylchloride, $(C_6H_5)_3CCl$.

The mass is kept at a temperature of 90° C. for 40 hours, filtered, and the filtered liquid is concentrated to 90 cc.

300 cc. of anhydrous ethyl ether are added. The light yellow solid thus obtained is crystallized twice in benzene. The crystalline product melts at 171° C. The elemental analysis gives the following results:

Found (percent): C, 86.0; H, 6.4; N, 2.3. Calculated (percent): C, 85.9; H, 6.3; N, 2.4.

By titration, the basic nitrogen percentage present in the compound is found to be 2.4%.

The infrared spectra have evidenced absorptions at 1745 cm.$^{-1}$ to be attributed to the ester group, at 3400 cm.$^{-1}$ to be attributed to the —NH— group, at 705 cm.$^{-1}$ and 755 cm.$^{-1}$ to be attributed to the mono-substituted aromatic group.

The N.M.R. spectrum has a band attributable to the protons of the aromatic hydrogens (phenyls), with $\delta=7-7.4$ and 3 bands with a triplet attributable to the following methylene groups:

$\delta=2.10$ attributable to —CH$_2$—COO
$\delta=2.43$ attributable to —CH$_2$—NH—
$\delta=1.75$ attributable to

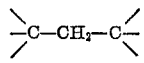

The data indicate the following structure for the tritylic compound:

$(C_6H_5)_3CNH(CH_2)_3COOC(C_6H_5)_3$
trityl 4-N-tritylaminobutyrate (b) Pyrrolidone polymerization.—4 g. of benzyltrimethylammonium chloride in 100 cc. H$_2$O are dropped on Amberlite IRA–400 resin (ion exchange resin of Rohm & Haas); the benzyltritylmethylammonium hydroxide (0.13 g./cc.), thus obtained is added in aqueous solution to 31 g. of pyrrolidone in such a way, that the pyrrolidonate salt subsequently formed has a 2 mol percent concentration with respect to the monomer.

The salification is carried out by water removal by azeotropic distillation with 800 cc. of xylene at 45° C. and 200 mm. Hg residual pressure, and by heating for a further 2 hours at 60° C. and 0.01 mm. Hg.

To the pyrrolidone and 2 mol percent pyrrolidonate contained in the vessel, anhydrous cyclohexane is added as suspending agent, under nitrogen atmosphere, as well as 1.30 g. (0.63 mol percent with respect to the monomer) of tritylic activator.

After about a 12-hour period of stirring at 25° C., the polymer is obtained in the form of a hard crust adhering to the reaction vessel walls. The polymer is broken into small pieces and ground with acetone in a mill of the Waring Blendor type, until a fine and white powder is obtained.

The polymer is obtained with an 84% yield; its relative viscosity (determined in 1% meta-cresol at a temperature of 25° C.) is 3.0. The polymer is extracted with H$_2$O for 24 hours in Soxhlet and then dried.

The thermal stability test is carried out by heating a portion of the polymer (about 3 g.) to 270° C., at a pressure of 0.1 mm. Hg, for 15 minutes.

The percentage weight loss (P percent) occurring under these conditions amounts to 10.1; the relative viscosity after the heat-treatment is 3.05.

Example 2

This example illustrates the polymerization of pyrrolidone in the presence of an activator of the prior art.

The operations are carried out exactly according to Example 1, but the tritylic activator is substituted by benzoylpyrrolidone at a concentration of 1 mol percent with respect to the monomer.

After a 14-hour polymerization, the following results are obtained:

Polymer yield, percent _____ 70
Relative viscosity _____ 3.8

The thermal stability test gives the following results:

Percentage weight loss _____ 11.8
Relative viscosity after treatment _____ 2.3

The polymer yield, relative viscosity before and after heat treatment, and percentage weight loss were determined as in Example 1.

Example 3

Example 1 is repeated, but the polymerization is carried out in the absence of suspending agents.

After 15 hours, the yield is 82.3% and the relative viscosity 3.2.

After heat treatment the percentage weight loss is 11.0 and the relative viscosity 3.2.

Example 4

Operating according to Example 3, but using, as activator, benzoylpyrrolidone at a concentration of 0.8 mol percent with respect to the monomer. After a 23-hour polymerization the following results are obtained:

Polymer yield, percent _____ 68
Relative viscosity _____ 3.9

After heat treatment the percentage weight loss is 17.2 and the relative viscosity 2.2.

Example 5

Operating according to Example 1, but utilizing the tritylic activator in a 0.4 mol percent concentration with respect to the monomer, a 12-hour polymerization:

Polymer yield, percent _____ 77
Relative viscosity _____ 4.0

After heat treatment the percent weight loss is 10.5 and the relative viscosity 3.55.

Example 6

Example 5 is repeated, but using as activator benzoylpyrrolidone in a 0.4 mol percent concentration with respect to the monomer. After a 12-hour polymerization the results attained are as follows:

Polymer yield, percent _____ 35
Relative viscosity _____ 2.8

The relative viscosity measured after heat treatment, carried out under the conditions of Example 5, is 2.3.

As this example demonstrates, use of the tritylic activator leads to polymer yields higher (twice as much) as the yield obtainable with benzoylpyrrolidone, and a considerable improvement in the stability of the polymer (heat-treated polymer).

Example 7

Operating as in Example 1, using the basic catalyst (benzyltrimethylammonium pyrrolidonate) in an amount of 1.5 mol percent with respect to the monomer, and the tritylic activator in an amount of 0.7 mol percent with respect to the monomer, there is obtained, after 12 hours, a polymer in a yield of 77%, and having a relative viscosity of 3.2.

After heat treatment the percentage weight loss of the polymer is 10, and the relative viscosity is 3.05.

Example 8

Example 7 is repeated, but using, instead of the tritylic activator, acetylpyrrolidone in an amount of 0.7 mol percent with respect to the monomer. After an 18-hour polymerization, the results are as follows:

Polymer yield, percent _____ 70
Relative viscosity _____ 5.05

After heat treatment the percentage weight loss of the polymer obtained is 18.3, and the relative viscosity is 2.6.

Example 9

Example 1 is repeated, but for a polymerization time of 4 hours. The following results are attained:

Polymer yield, percent _____ 52
Relative viscosity _____ 2.75
Percentage weight loss after heat treatment ____ 10.9
Relative viscosity after heat treatment _____ 2.75

Example 10

Example 1 is repeated, operating at 50° C. for a 4-hour polymerization time. The polymer yield is 64%; the polymer relative viscosity is equal to 2.6. After heat treatment, the results are as follows:

Percentage weight loss _____ 12.3
Relative viscosity _____ 2.6

Example 11

Example 1 is repeated. After an 8-hour polymerization, the polymer yield is 77% and the relative viscosity is 3.2. After heat treatment the following results are obtained:

Percentage weight loss _____ 9.4
Relative viscosity _____ 3.15

Example 12

Example 10 is repeated. After an 8-hour polymerization, the polymer yield is 70% and the relative viscosity is 2.45. After heat treatment, the results obtained are as follows:

Percentage weight loss _____ 9.1
Relative viscosity _____ 2.4

Example 13

0.048 g. of 50% sodium hydride are reacted in vaseline—in a waterless vesssel, in nitrogen stream and at a temperature of 80° C.—with 11.3 g. of caprolactam, to obtain a caprolactam solution having a concentration of 1 mol percent with respect to the monomer.

At the end of the hydrogen release 0.293 g. of tritylic activator are added (0.5 mol percent with respect to the monomer). After a 2-hour polymerization at 180° C., a pale yellow polymer is obtained, which is then finely milled. A portion of polymer is extracted with water for 14 hours in Soxhlet. The portion extracted in water is determined after drying, and the caprolactam yield, amounting to 98.3%, is thus found.

The relative viscosity (determined in 1% meta-cresol at 25° C.) is 5.8. A portion of this polymer is heated in a sealed vial, under nitrogen, to a temperature of 250° C. for 15 minutes. The polymer viscosity after such treatment is 4.8.

Example 14

The operations are carried out according to Example 13, but using acetylpyrrolidone as activator; a caprolactam yield of 97% and a polymer relative viscosity of 4.8 are thus obtained. After heat treatment according to Example 13, the relative viscosity decreases to 3.4.

It will be apparent that various changes in details can be made in practicing this invention, without departing from its spirit. Therefore, we intend to incude in the scope of the appended claims all modifications and variations which will be obvious to those skilled in the art from the description and illustrative working examples given herein.

What we claim is:

1. Process for the preparation of a fiber-forming polymer of pyrrolidone which comprises polymerizing pyrrolidone in contact with the anionic alkaline polymerization catalyst and, as activator, trityl-4-N-tritylaminobutyrate of the formula $$(C_6H_5)_3CHN(CH_2)_3COOC(C_6H_5)_3$$

2. Process according to claim 1, characterized in that the catalyst is the salt obtained from pyrrolidone and benzyltrimethylammonium hydroxide.

3. The process according to claim 1, characterized in that the tritylic compound is used in an amount of from 0.01 to 2.0 mol percent with respect to the pyrrolidone to be polymerized.

4. The process according to claim 1, characterized in that the tritylic compound is used in an amount of 0.1 to 1.0 mol percent with respect to the pyrrolidone to be polymerized.

References Cited

UNITED STATES PATENTS

| | | | |
|---|---|---|---|
| 3,016,366 | 1/1962 | Glickman et al. | 260—78 P |
| 3,016,367 | 1/1962 | Glickman et al. | 260—78 P |
| 3,022,274 | 2/1962 | Glickman et al. | 260—78 P |
| 3,036,046 | 5/1962 | Glickman et al. | 260—78 P |
| 3,042,659 | 7/1962 | Follett | 260—78 P |
| 3,060,153 | 10/1962 | Follett | 260—78 P |
| 3,148,174 | 9/1964 | Glickman et al. | 260—78 P |
| 3,026,301 | 3/1962 | Ney | 260—78 P |
| 3,072,615 | 1/1963 | Riedesel | 260—78 P |

HAROLD D. ANDERSON, Primary Examiner

U.S. Cl. X.R.

260—45.85, 78 L, 78 SC, 471 A

UNITED STATES PATENT OFFICE
CERTIFICATE OF CORRECTION

Patent No  3,745,152            Dated  July 10, 1973

Inventor(s)  Aldemaro Ciaperoni et al

It is certified that error appears in the above-identified patent and that said Letters Patent are hereby corrected as shown below:

Caption of printed patent:
"Milan" should be inserted after "Bollate" and "Rho" the inventors addresses; the priority claimed is March 18, 1970 not March 17, 1970.

Col. 2, line 3, "good" should be - - -acceptable- - - line 5, "Polyprrolidone" should be - - -Polypyrrolidone- - -.

Col. 6, Claim 1, line 20, "the" should be - - -an- - -

Signed and sealed this 2nd day of April 1974.

(SEAL)
Attest:

EDWARD M. FLETCHER, JR.
Attesting Officer

C. MARSHALL DANN
Commissioner of Patents